Feb. 11, 1964 G. D. PICKERING 3,120,686
MOLDING FASTENER
Filed Oct. 24, 1962
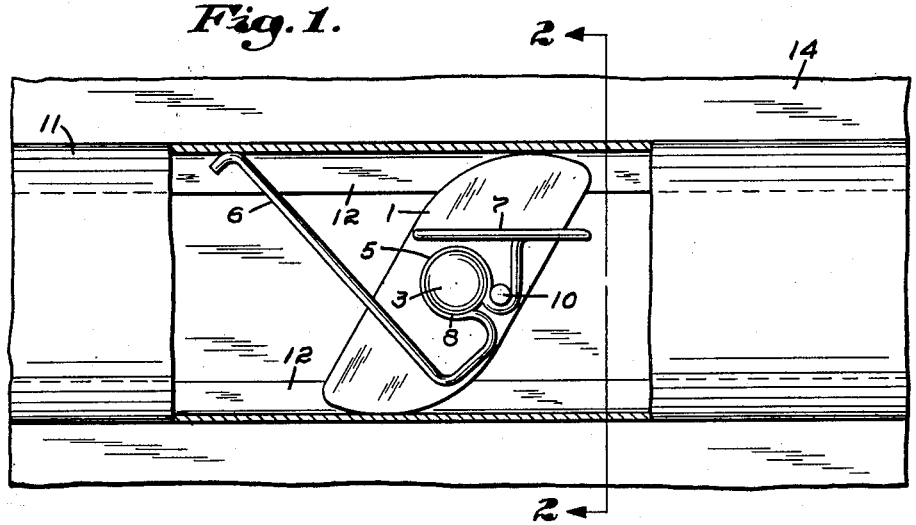
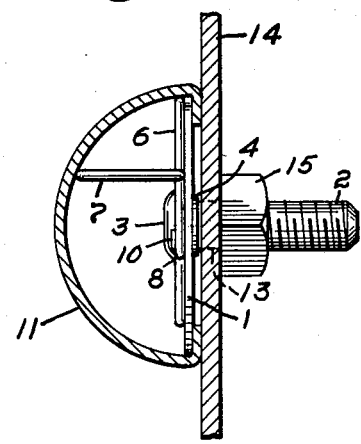
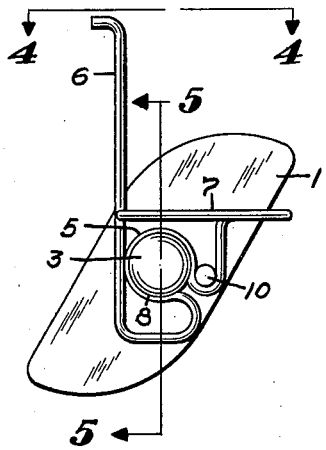
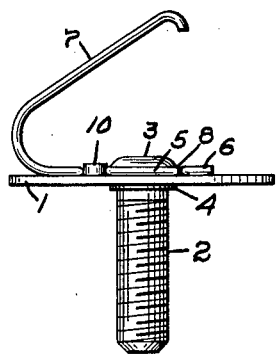
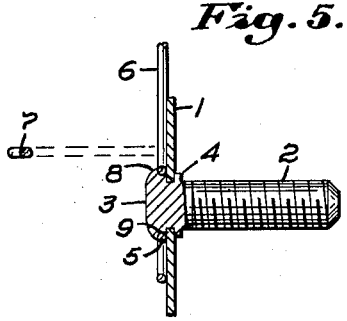
Inventor:
George D. Pickering.
by Walter S. Jones
Atty.

3,120,686
MOLDING FASTENER
George D. Pickering, Arlington, Mass., assignor to United-Carr Fastener Corporation, Cambridge, Mass., a corporation of Delaware
Filed Oct. 24, 1962, Ser. No. 232,702
1 Claim. (Cl. 24—73)

This invention relates to molding attaching fastener by which a hollow molding may be attached to a support such as is used in the construction of motor vehicle bodies, appliances, etc.

An object of the invention is to provide a new molding attaching fastener having a plate member, a fastening member, carried by the plate member, and a molding engaging spring member snapped into engagement with a part of the fastening member.

Another object of the invention is to provide a molding attaching fastener in which the plate member and the fastening member may be standard and different sizes and shapes of molding engaging spring members may be used depending upon the size and shape of the molding.

Referring now to the drawings:

FIG. 1 is a plan view, partly in section, of an installation showing an improved attaching fastener as a part of the assembly;

FIG. 2 is a section on the line 2—2 of FIG. 1;

FIG. 3 is a plan view of the fastener shown in FIG. 1;

FIG. 4 is an end view in elevation taken generally along the plane 4—4 of FIG. 3; and FIG. 5 is a section taken on the line 5—5 of FIG. 3.

Molding fasteners of the general type for which the instant device may be used are known but they have been expensive to construct and not always satisfactory. For instance, when the plate, fastener member, and spring have been assembled, prior to heat treating the spring and/or plating or painting of the parts, the best type of attaching fastener has not been the result. Furthermore, when an odd shaped spring is required it is difficult to make and assemble the parts, or some of them, in the same manufacturing machine unless special expensive manufacturing equipment is constructed for the job.

In the present attaching fastener construction all of the parts are manufactured separately and the heat treating, plating, painting, etc. (as required) take place before assembly. In this manner proper heat treating of the spring, proper plating, painting, etc. may be accomplished to provide the most efficient fastener. Assembly of the spring, in the present device, may be by hand, semi-automatic equipment or fully automatic equipment depending upon the quantities desired.

Referring now to the device illustrated by the drawings the improved molding attaching fastener includes an elongated plate member 1 that is properly shaped for insertion into molding anywhere along its length, as will be described hereafter. The device also includes a suitable fastening member 2 herein shown as a bolt attached to the plate member by a head 3 and staked portions 4 formed from the shank of the screw in the same manner as now used in some of the present devices. The device also includes a spring member formed of wire and having a socket spring loop portion 5, first molding engaging spring finger 6 and a second molding engaging spring finger 7, as best shown in FIGS. 3 and 4. Heretofore, the spring member was usually shown attached to either the plate member or the fastener member. In the present construction the spring is snapped into engagement with the fastener member 2 and this is accomplished by having the head portion 3 in the form of a snap fastener stud having a guiding edge portion 8 and a neck portion 9, as clearly shown in FIG. 5.

Assembly of the parts of the improved molding attaching fastener, above described, may be easily accomplished after proper heat treating of the spring and plating and/or painting of the three parts of the fastener, first by staking the fastener bolt member 2 to the plate member 1 and then by snapping the socket loop portion 5 of the spring over the guiding portion 8 of the stud 3 into the groove 9. In order to insure proper relative position of the spring to the plate member 1 a boss 10 is formed in the plate member 1 (FIGS. 3 and 4). This boss 10 also prevents relative rotation of the spring to the plate member 1 when the spring finger 6 is tensioned.

To assemble the molding attaching fastener to the molding 11 (FIG. 1) it is only necessary to insert the plate portion 1 between the inturned flanges 12—12 at a desired location and at the same time rotate the plate into the position shown in FIG. 1 and also tension the spring finger 6 from the position shown in FIG. 3 to the position shown in FIG. 1. Thus, the fastener is held in assembly with the molding 11 and thereafter the fastener member 2 may be passed through an aperture 13 in the support plate 14 and a nut member 15 applied, as shown in FIG. 2. The second spring finger 7 is provided, in the construction shown, to act as a sort of "trolley" which is desirable in relatively high moldings such as shown by FIG. 2 to keep the plate from backing away when the nut 15 is being applied and also to keep the fastener in the proper relative position to the molding before it is attached to the support 14.

An advantage of the spring construction and the snap fastener arrangement with the fastener member is the fact that, when the first spring finger 6 is tensioned, the socket spring portion 5 will more tightly grip the fastener member 2. Here again, the boss 10 may come into play especially if there is any looseness due to manufacturing tolerances in the parts of the snap fastener portions. In this case the boss will prevent relative rotation of the spring to the fastener member 2 until the spring portion 5 grips the neck 9 of the stud shortly after the first spring finger 6 is tensioned.

It should be understood that the second spring 7 may be eliminated when the device is to be used with relatively shallow moldings while retaining the first spring finger and the snapping arrangement of the spring to the fastener member.

While there has been illustrated a particular improved molding attaching fastener construction that is relatively simple, efficient, easy to assemble, and requires a minimum number of parts to provide for greater variations in molding, it should be understood that the invention is best defined by the following claim.

I claim:

A molding attaching fastener for attaching a hollow molding to a support, said fastener having an elongated plate member, having spaced ends for engagement with a molding, for insertion into a hollow molding anywhere along its length by insertion and rotary action, said plate member having a projection extending angular relationship thereto, a fastener member extending from said plate member and having a groove formed therein and an expandable molding engaging spring member having a socket spring portion assembled in said groove and a portion extending laterally beyond said plate member and adapted to engage said molding and said spring member engaging a portion of said projection to prevent rotation of said spring member relative to said fastener member.

References Cited in the file of this patent

UNITED STATES PATENTS

| | | |
|---|---|---|
| 2,713,186 | Borowsky | July 19, 1955 |
| 2,745,156 | Bedford | May 15, 1956 |
| 2,820,270 | Scott | Jan. 21, 1958 |
| 2,879,569 | Poupitch | Mar. 31, 1959 |
| 3,038,223 | Fiddler | June 12, 1962 |
| 3,077,019 | Cochran | Feb. 12, 1963 |